March 17, 1942. G. A. LYON 2,276,405
WHEEL STRUCTURE
Filed Nov. 25, 1940
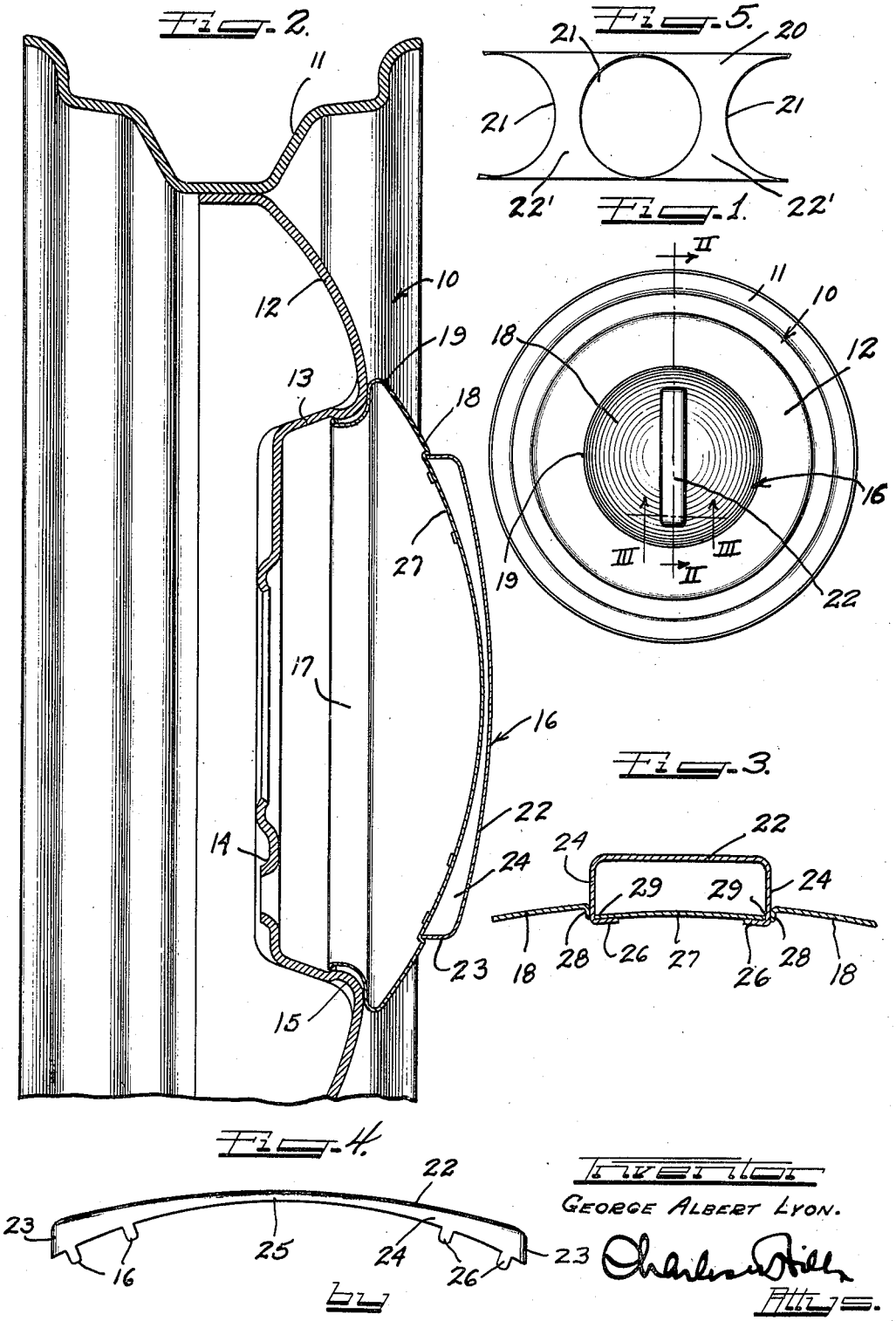
Inventor
GEORGE ALBERT LYON.

Patented Mar. 17, 1942

2,276,405

UNITED STATES PATENT OFFICE 2,276,405

WHEEL STRUCTURE

George Albert Lyon, Allenhurst, N. J.

Application November 25, 1940, Serial No. 366,974

11 Claims. (Cl. 301—108)

This invention relates to a wheel structure, and more particularly to a reinforced wheel cover or hub cap for the wheel.

An object of this invention is to provide an improved wheel cover, disk, or hub cap with a reinforced central structure, which reinforcement may be provided by utilizing the waste between adjoining blanks punched from sheet metal and from which the hub cap members are made.

Another object of this invention is to provide a simple way of reinforcing and ornamenting the central spherical-like surface of a hub cap or wheel disk and which does not require the provision of any special retaining means other than the use of slots in the face of the hub cap and cooperating projections on the reinforcement.

In accordance with the general features of this invention, there is provided in a wheel structure a wheel cover comprising a circular convexly curved member having on its outer face a transverse hollow reinforcing element with rear edges curved to conform and fit tightly the curved convex surface of the member and provided with means for securing it to the member.

Another feature of the invention relates to the construction of the reinforcing element so that the central crown portion of the hub cap or wheel cover can telescope the same and whereby the marginal portions of the reinforcing element may be utilized to anchor the reinforcing element to the convexly shaped hub cap or cover member.

Other objects and features of this invention will more fully appear from the following description taken in connection with the accompanying drawing which illustrates a single embodiment thereof, and in which:

Figure 1 is a front view of a wheel structure embodying the features of this invention;

Figure 2 is an enlarged fragmentary cross sectional view taken on the line II—II of Figure 1 looking in the direction indicated by the arrows and showing clearly the cross sectional shape of the wheel cover member of my invention and the manner in which it cooperates with the wheel;

Figure 3 is an enlarged fragmentary cross sectional view taken on the line III—III of Figure 1 looking in the direction indicated by the arrows;

Figure 4 is a side elevation of the reinforcement which is adapted to be secured to the hub cap or wheel cover member in accordance with the features of this invention; and Figure 5 is a diagrammatic view illustrating how the waste between adjoining hub cap disks or blanks in sheet stock may be utilized for the fabrication of my novel hub cap reinforcing element.

As shown on the drawing:

The reference character 10 designates generally a wheel including a conventional drop center tire rim 11 fastened to a central disk-like wheel body 12 having a centrally recessed portion 13 accommodating a hub cap and also having a wheel fastening flange 14 for securement in the usual way by wheel bolts to the wheel mounting on an automobile axle. The central recessed portion 13 of the wheel body is provided with a plurality of spaced radial bumps or protuberances 15 for retaining cooperation with a hub cap 16 embodying the features of this invention. These retaining bumps and the manner in which they cooperate with the hub cap do not per se constitute a part of this invention, since that subject matter has been fully covered in previous Letters Patent granted to me.

The hub cap or wheel cover member 16 is in the form of a convex disc having a rearwardly extending flexible skirt 17 which is adapted to be sprung in its entirety into retaining cooperation with the protuberances 15. The skirt 17 is in the form of a continuous annulus and is resiliently flexible as the cover member or cap 16 is pressed axially into retaining cooperation with the central recessed portion 13 of the wheel.

The cap 16 also includes a convexly curved or crowned central portion 18 having its peripheral part turned inwardly into the flexible skirt 17. The peripheral or turned part 19 of the cap 16 is adapted to be seated on the wheel body 12, as shown in Figure 2.

It has been the practice to make hub caps or wheel members such as above described out of relatively thin sheet material, such, for example, as stainless steel or 18-8 sheet steel. Due to the thinness of this material, which for example may be .020", it is desirable in some cases to reinforce the outermost or central portion of the convexly curved crown 18 of the wheel cover member. However, on account of the fact that these hub caps must be made as economically as possible, it is desirable to avoid as much as feasible any adornments or reinforcements which would add materially to the expense of producing the hub cap. To this end, I propose to reinforce and ornament the central portion of the hub cap by utilizing the waste stock incident to the fabrication of the hub cap from sheet metal.

In Figure 5, I have illustrated diagrammatically a strip 20 of sheet metal in which the circular holes 21 designate where circular disks have been blanked from the strip and from which disks the hub caps are made. In the blanking of these disks from the strip 20, it is, of course, necessary to have slight spacing between them so as to provide a hold down track during the blanking operation. As a consequence, there is considerable waste 22' between the disks blanked from the strip, and it is from this waste that I propose to provide or form reinforcements for the hub cap. By slightly increasing the width of the waste it is possible to provide ample stock from which the reinforcement shown in Figure 4 and designated generally by the reference character 22 may be fabricated. The waste portions from which these reinforcements 22 are made are designated in Figure 5 by the reference character 22'.

Each of the waste portions 22', as will be perceived from Figure 5, is of a shape resembling the cross section of a spool or an I-beam. The problem, therefore, that confronted me was to provide a reinforcement of such construction that this oddly shaped waste portion could be utilized to the fullest advantage in the formation of the reinforcement.

It has been found that by forming the waste into a rectangular hollow body it is feasible to utilize substantially all of the waste in the reinforcement. In this forming operation, the rectangular member is formed in the direction of the length of the waste 22' or, in other words, transversely to the direction of the length of the strip 20, and the marginal portions of the waste are bent into end flanges 23 and curved side flanges 24 (Figure 4). Each of the two side flanges 24 has a curved edge 25 which corresponds substantially with the contour of the convexly curved or spherical-like outer surface of the crown portion 18 of the hub cap 16. In other words, these two parallel curved edges 25 are adapted to tightly fit and embrace the outer surface of the hub cap.

Also, in order to provide for the securement of the reinforcing element 22 to the hub cap proper, the side flanges 24 are provided with a plurality of tangs or projections 26 which, as shown in Figure 4, may be four in number on each flange.

In Figures 2 and 3, I have illustrated the manner in which the central portion 18 of the hub cap and the element 22 are interengaged or held in telescoped or nested relationship. The central portion 18 of the hub cap is slightly indented or pressed in at 27, as shown in Figures 2 and 3, so as to provide substantially a rectangular seat for the reinforcing element. In applying the element 22 to the hub cap, it is first seated on the portion 27 with its side flanges 24 in abutting relation with the parallel shoulders or flanges 28 formed in the hub cap portion 18 by reason of the indenting of portion 27. In the act of inserting this element 22 and the indented central portion of the cap 18, the prongs 26 are brought into register with slots 29 in the indented portion 27 and are passed through the slots. Thereafter to clinch the element 22 to the member 16, the prongs or tangs 26 are bent laterally underneath the portion 27, as shown in Figure 2, thus firmly attaching the element 22 to the hub cap proper.

By reason of the nested or telescoping cooperation of the reinforcing element 22 with the cover member, it will be appreciated that these two parts are held in firm interlocked relationship. Not only does the element 22 reinforce the central portion of the hub cap, but in addition thereto it provides a novel ornamentation for the hub cap. This element 22 may be provided with any suitable insignia or indicia, such, for example, as the name of the automobile, or it may be colored or finished in contrast to the main body of the hub cap.

It should also be noted that the rear edges 25 of the flanges 24, by reason of their being seated on the indented portion 27, serve to conceal the slots 29 in the indented portion, thus enhancing the appearance of the construction.

From the foregoing, it will be appreciated that I have provided a very simple and economical method of reinforcing the central portion of the hub cap and at the same time providing a way of attaching a name plate or other ornamental device to the central part of the cap.

I claim as my invention:

1. As an article of manufacture, a wheel cover comprising a circular convexly curved member having on its outer face a transverse hollow reinforcing element with rear edges curved to conform to and fit tightly the curved convex surface of said member and provided with means for securing it to said member.

2. As an article of manufacture, a wheel cover comprising a circular convexly curved member having on its outer face a transverse hollow reinforcing element with rear edges curved to conform to and fit tightly the curved convex surface of said member and provided with means for securing it to said member, said securing means for said element and member comprising tangs on one of them inserted through slots in the other and bent to clinch the element and member together.

3. As an article of manufacture, a wheel cover comprising a circular convexly curved member having on its outer face a transverse reinforcing element with rear edges curved to conform to and fit tightly the curved convex surface of said member and provided with means for securing it to said member, said member and element being in nested relationship.

4. As an article of manufacture, a wheel cover comprising a circular convexly curved member having on its outer face a transverse hollow reinforcing element with rear edges curved to conform to and fit tightly the curved convex surface of said member and provided with means for securing it to said member, said element being of a substantially rectangular configuration and being positioned so that a plane passing through the axis of said member intersects and is common to said element.

5. As an article of manufacture, a wheel cover comprising a circular convexly curved member having on its outer face a transverse hollow reinforcing element contiguous with the surface of said member and extending across the center of the member, said element being secured to said member by concealed retaining means.

6. As an article of manufacture, a wheel cover comprising a circular convexly curved member having on its outer face a transverse hollow reinforcing element contiguous with the surface of said member and extending across the center of the member, said element being secured to said member by concealed retaining means, said element having end and side flanges embracing the curved surface of said member with the central portion of said member telescoping said element.

7. As an article of manufacture, a wheel cover comprising a circular convexly curved member having on its outer face a transverse reinforcing element contiguous with the surface of said member and extending across the center of the member, said element being secured to said member by concealed retaining means, said element comprising a strip of metal with rearwardly turned marginal portions having curved edges conforming to the curvature of the exterior surface of said convex member.

8. As an article of manufacture, a wheel cover comprising a circular convexly curved member having on its outer face a transverse hollow reinforcing element contiguous with the surface of said member and extending across the center of the member, said element being secured to said member by concealed retaining means.

9. As an article of manufacture, a wheel cover comprising a circular convexly curved member having on its outer face a transverse hollow reinforcing element with rear edges curved to conform to and fit tightly the curved convex surface of said member and provided with means for securing it to said member, said outer face of the cover member being slightly indented in a shape corresponding to that of the overall shape of the reinforcing element and providing a seat for the element whereby the rear edges of the element may be nested inside of the indented portion.

10. As an article of manufacture, a wheel cover comprising a circular convexly curved member having on its outer face a transverse hollow reinforcing element with rear edges curved to conform to and fit tightly the curved convex surface of said member and provided with means for securing it to said member, said outer face of the cover member being slightly indented in a shape corresponding to that of the overall shape of the reinforcing element and providing a seat for the element whereby the rear edges of the element may be nested inside of the indented portion, said rear edges of the element having laterally extending tangs projected through slots in the indented portion of the cover member and interlocked therewith by being bent toward each other on the under surface of the indented portion.

11. As an article of manufacture, a wheel cover comprising a circular convexly curved member having on its outer curved face a transverse hollow reinforcing and ornamental element, said outer face being indented to have seated therein said reinforcing element, and said reinforcing element having rear edges curved to conform to and fit tightly the surface of said indented portion and being provided with tangs projecting through slots in said indented portion for retaining the element on said member, said rear edges concealing said slots in the indented portion.

GEORGE ALBERT LYON.